Patented Feb. 21, 1928.

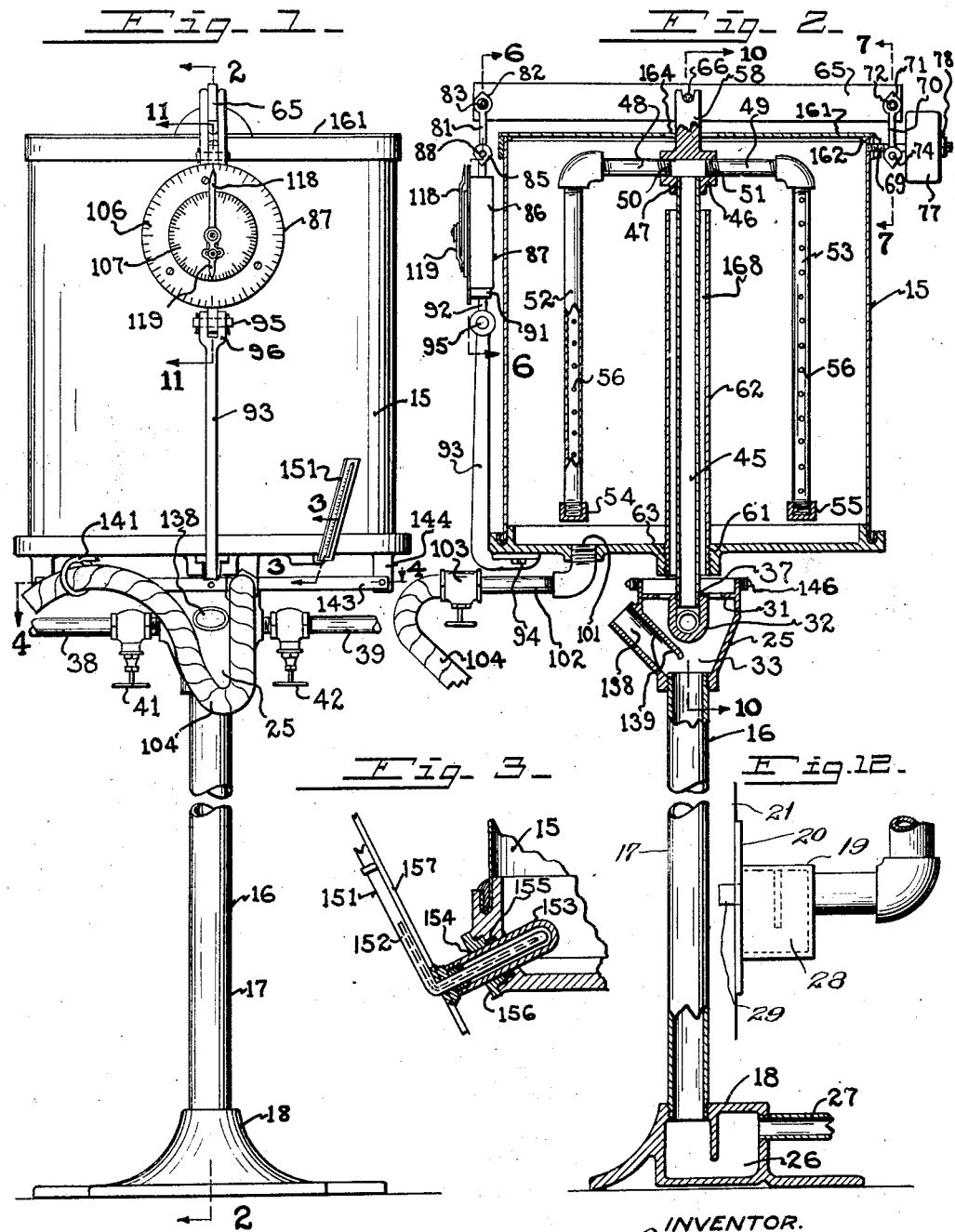

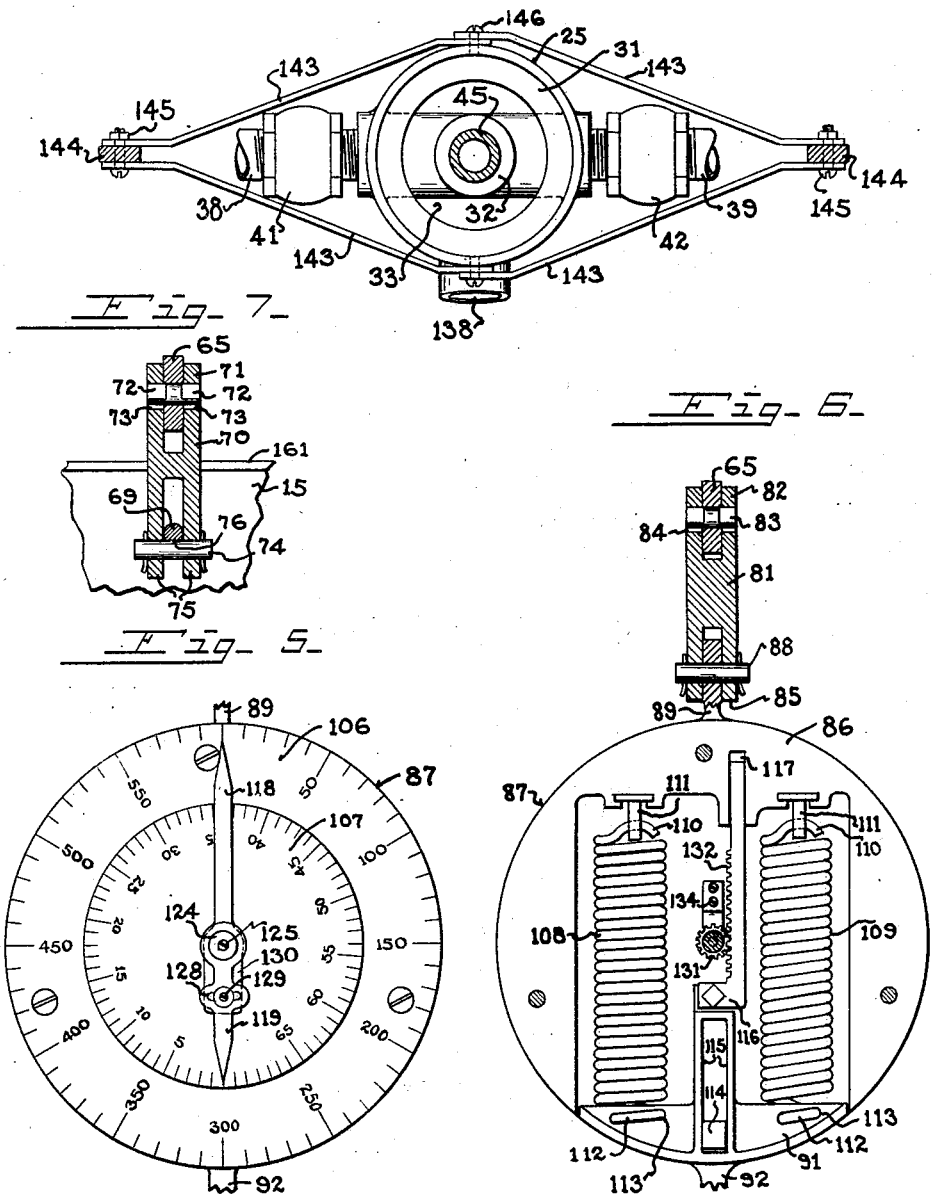

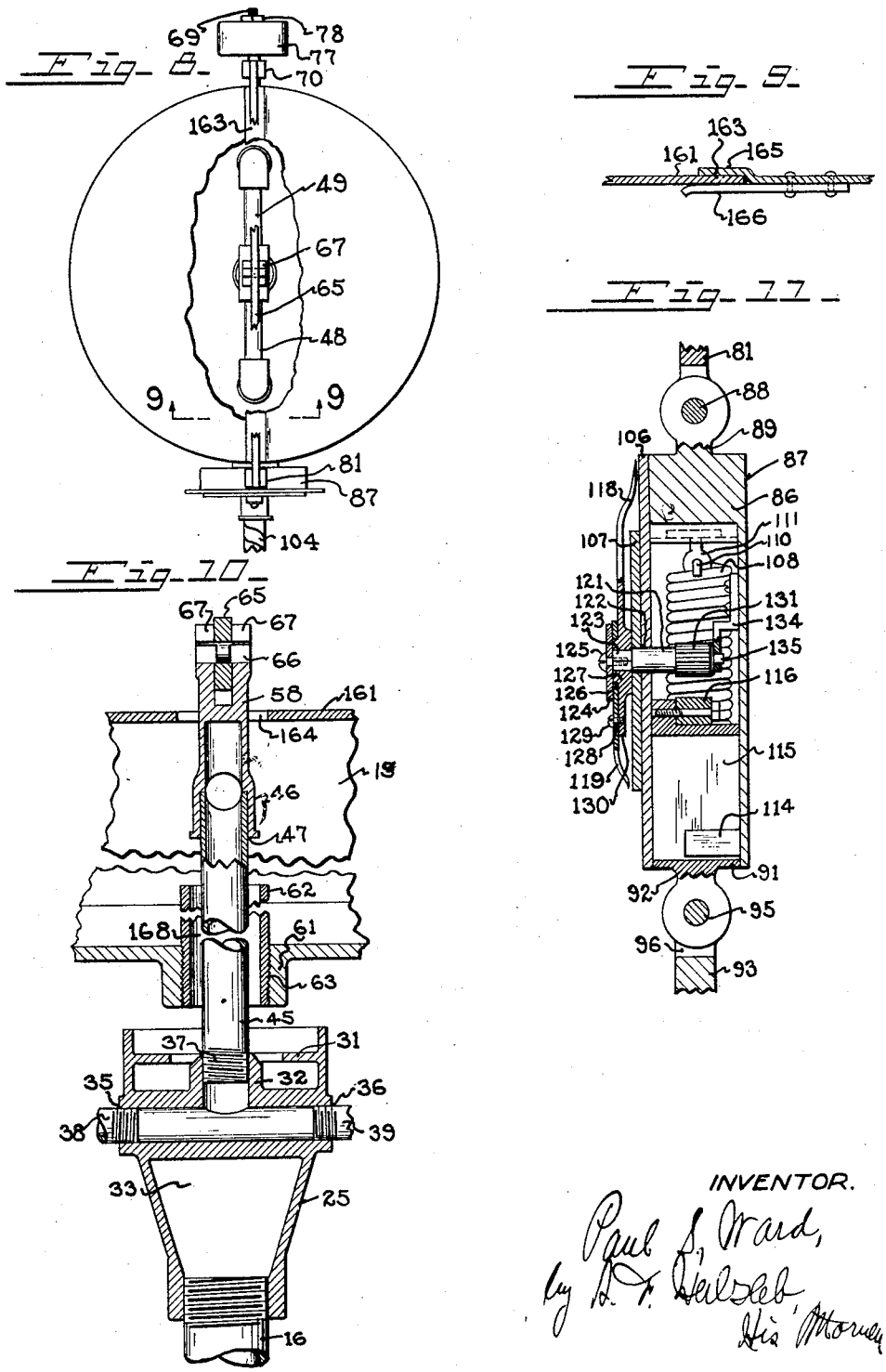

1,660,110

UNITED STATES PATENT OFFICE.

PAUL S. WARD, OF CINCINNATI, OHIO, ASSIGNOR TO THE TRIUMPH MANUFACTURING COMPANY, OF CINCINNATI, OHIO, A CORPORATION OF OHIO.

TEMPERING, MEASURING, OR WEIGHING MECHANISM.

Application filed June 20, 1924. Serial No. 721,318.

It is the object of my invention to provide new and improved means whereby to temper the liquid to be employed in mixing batches for use in the baking art. This liquid is usually water, or other liquids may be employed. It is desirable that the temperature of the liquid be controlled so that the same may be discharged into the batch at proper temperature for best results in mixing and baking.

It is the object of my invention, therefore, to provide novel means whereby the temperature of the liquid is controlled; further, to provide novel means whereby mixing of the liquid is insured; further, to provide novel means whereby the liquid is weighed or measured; further, to provide novel means whereby the elevation of the liquid in the tank is controlled; and, further, to provide novel means whereby predetermined quantities of the liquid may be taken from the tank.

The invention will be further readily understood from the following description and claims, and from the drawings, in which latter:

Fig. 1 is a side elevation of my improved device, partly broken away.

Fig. 2 is a central vertical section of the same, taken on the line 2—2 of Fig. 1.

Fig. 3 is a detail of the thermometer mounting, shown in vertical section on the line 3—3 of Fig. 1.

Fig. 4 is a horizontal cross-section of my improved device, taken on the line 4—4 of Fig. 1, showing the stabilizing means.

Fig. 5 is a front elevation of the indicator.

Fig. 6 is a vertical section of the same, taken on the irregular line 6—6 of Fig. 2.

Fig. 7 is a detail of the weighing mechanism, shown in vertical section on the line 7—7 of Fig. 2.

Fig. 8 is a plan view of my improved device, partly broken away.

Fig. 9 is a detail of the cover for the tank, taken in section on the line 9—9 of Fig. 8.

Fig. 10 is a vertical section of my improved device, taken on the line 10—10 of Fig. 2, partly broken away.

Fig. 11 is a vertical section of the scales and connections for the same, taken on the line 11—11 of Fig. 1; and Fig. 12 is a side elevation, partly broken away, showing a modified form of support for my improved device.

There is a tank 15 which is supported in connection with a weighing or measuring device in such manner as to weigh or measure the contents of the tank, and of the quantity removed therefrom.

In the present exemplification there is a support 16 which may take the form of a pedestal, as shown at 17, mounted on a base 18, which may rest on or be secured to the floor. The support may take the form of a bracket 19, as shown in Fig. 12, which bracket may comprise a plate 20 suitably secured to a wall or upright exemplified at 21.

A bowl 25 is shown on the support, and may be a part of the same. The pedestal, and the bracket if employed, may be a pipe, which in the form of the pedestal communicates with a trap 26 in the base, from which a waste pipe 27 extends. When the support is in the form of a bracket, the pipe may discharge into a trap 28, located in the supporting plate 20 of the bracket, and have a waste pipe 29 communicate therewith. The pipe of the pedestal or bracket serves as a waste pipe.

The bowl comprises a web 31, in which there is a T-passage 32, and at the outside of which, between said web and the outer wall of the bowl, there are outlet-passages 33. The T-passage forms an inlet or feed-passage having openings 35, 36, at the outside of the bowl, and an opening 37 at the inside of the bowl.

Feed-pipes 38, 39, are connected with the inlet openings, as by having usual threaded connections therewith. Valves 41, 42, are located in said pipes for regulating the inflow of fluid, independently through each of the inlet-ports of said feed-passage. One of said pipes and valves may, for instance, be employed for feeding water of ordinary temperature, as from a public service pipe or from other suitable source, and the other pipe and valve may be employed for feeding heated water or steam. The valves regulate and control or shut off the supply of fluid of either temperature. Thus the valve 41 may be employed for water of ordinary temperature and the valve 42 for the heated water or steam.

A feed-pipe 45 extends upwardly from the web and has threaded connection with the port 37 of the inlet passage in the support. This feed-pipe forms a continuation of the support and has a coupling 46 at its upper end, having a port 47, which has threaded connection with the upper end of the feed-pipe. Branch feed-pipes 48, 49, have connections shown as threaded connections, with the ports 50, 51, these branch pipes having depending sections 52, 53, extending therefrom, shown closed at their lower ends by caps 54, 55. Preferably one of the sides of each of said depending sections has holes 56 therein, extending in directions to cause the jets of liquid ejected therefrom into the tank to be injected in the same directions about the tank, and preferably downwardly so as to cause a swirling motion of the body of liquid in the tank to thoroughly mix said liquid.

The coupling at the top of the inlet-pipe preferably has an upward extension 58, which preferably forms supporting means for the tank, the latter being exemplified as surrounding the inlet-pipe, forming a compact construction, and also providing a median supporting means for the tank, for providing accuracy in the weighing of the contents of the tank.

The bottom of the tank is provided with a central aperture 61, in which a pipe 62 is secured to form a liquid-tight joint, as by having threaded connection 63 with the wall of said aperture, forming an outlet-spout for the tank discharging into the bowl 25. This pipe is shown as extending upwardly into the tank, and is of the desired height for the desired limit of capacity of the tank. The liquid in the tank is arranged to overflow into this pipe, and to be discharged into the bowl 25, through the outlet-passages therein, and the outlet-pipe of the pedestal or bracket. The height of the outlet-pipe in the tank will determine the amount of liquid which the tank may receive prior to overflow, and thus regulate the weight or quantity of liquid which the tank is to receive. Any desired less quantity may be received in the tank and be measured or weighed.

The manner of supporting the tank is exemplified as the upward extension 58, which is in the form of a fork at the upper end of the support or standard, and a beam 65. The beam has pivot connection with the fork, as by having a knife edge lug 66 at each side of the beam received in sockets 67 in the fork.

A rod 69 extends from one side of the tank in rigid relation therewith. A link 70 connects the adjacent end of the beam with the rod, this link being preferably fork-shaped at its respective ends, the upper fork 71 being received about the beam and connected therewith by means of knife-edged lugs 72 received in holes 73 of said fork at the respective sides of said beam, and a pin 74 extending through the lower fork 75 and received in a recess 76 in the lower face of the rod 69.

The rod has a counterbalance weight 77 thereon, which is adjustable lengthwise of the rod by having a threaded hole therein threaded to the threaded portion of the rod, and a clamp-nut 78 received over said threaded portion for fixing the counterbalance weight in place.

The other end of the beam has a link 81 articulated therewith, as by having an upper fork 82 in which the beam is received, the beam being provided with knife-edge lugs 83 received in holes 84 of said upper fork. A lower fork 85 of said link has articulation with one member 86 of a scales 87, as by means of a pin 88 received through holes in said lower fork and a hole in a shank 89 extending from the member 86 of the scales. The other member 91 of the scales has a shank 92 extending therefrom, which is articulated with a bracket 93, having connection with the tank, as by being fixed thereto by means of bolts 94. This articulation may be by means of a pin 95 received through a hole in said shank 92 and in holes in a fork 96 on said bracket received about said lug.

The tank is provided with a discharge opening 101, with which a discharge-pipe 102 communicates, having a valve 103 therein. A flexible pipe, shown as a hose 104, extends from the pipe 102, and forms part of the discharge-pipe.

The contents of the tank, after suitable tempering and mixing and weighing or measuring of the same, may be discharged into the container which is to receive the same, which may be a mixing vessel for mixing a batch of batter or dough or for other purposes.

As the liquid is fed into the tank, or the liquid is discharged therefrom, the weight and volume of the liquid in the tank varies. These variations are shown on the dials 106, 107, of the scales, which indicate respectively the weight and volume of the contents. This scales is shown as comprising the relatively movable members 86, 91. The relative movement is controlled according to the weight or volume in the tank, to weigh or measure the same, a suitable device being provided to indicate such relative movement so as to indicate such weight or volume.

The means for controlling the relative movement is exemplified as springs 108, 109, the respective ends of which are connected with the respective movable members, as by having one of the ends 110 of the springs received through eyes 111, fixed to the movable member 86, and having the other ends of the springs in the form of hooks 112, received through holes 113 in the movable member 91. Means are provided for guiding relative movement between said members, shown as a right line movement, and as guiding means comprising a lug 114 on member 86, guided by the walls of a slot 115 on the member 91, and a bar 116 on member 91 guided in a guideway 117 in member 86.

In the present exemplification the dial 106 is divided into pounds, and the dial 107 is divided into gallons, although other denominations may be employed. An indicating member comprises a pointer 118 and a pointer 119, respectively registering with the respective dials 106, 107. The pointers are preferably adjustable with relation to each other, as by fixing the pointer 118 to a shaft 121, and adjustably positioning the pointer 119 with relation to the pointer 118, so as to position both pointers to normally register respectively with zero marks on the dials 106, 107. These two dials are preferably in fixed relation, as by having them respectively on plates fixed together in suitable manner, and having the dial 106 fixed to the member 86 of the scales.

The pointer 118 may be provided with a bearing 122 having a square hole received over a square end 123 of the shaft 121, a washer 124 and screw 125 threaded into the shaft holding the pointer thereon. The pointer 119 is provided with a bearing 126 received about a hub 127 formed on the bearing 122, and be provided with a slot 128 through which a screw 129 is received into a threaded hole in the tail 130 of the pointer 118, for clamping the pointers together in adjusted relation. When the scales correctly balance, with the pointer 118 at zero, the pointer 119 may be adjusted with relation thereto in coincidence with zero on the dial 107.

Motion is imparted to the pointers and the shaft on which they are located by providing the shaft with a pinion 131 which is meshed by a rack 132 on the bar 116 secured to the member 91. The shaft is journaled in a bearing located in a bracket 134 fixed to the member 86 and in a bearing 135 in the dial plates.

In the present exemplification the relative movement between the members of the scales is twice that of the tank, for the reason that there are opposite movements of the tank and that end of the beam with which the scales has connection, making indications of minute differences of weight in the tank possible on the scales.

The bowl 25 is preferably provided with an inlet-passage 138 directed downwardly into the outlet-pipe and having a baffle-wall 139 of such form as to direct the overflow liquid from the outlet-pipe 62 past the inlet-passage 138. The end of the flexible pipe may be received in the said inlet-passage for discharging liquid from the tank into the overflow pipe, in case, for instance, it is desired to empty the tank, or to reduce the amount of liquid in the tank without utilizing the same, or to reduce the amount of liquid in the tank to correspond with desired scale readings or temperature readings.

The flexible discharge pipe is employed for discharging liquid from the tank into the container in which the liquid is to be utilized. When not in use, the end of the flexible pipe may be received through a ring 141 secured to the tank. The flexible pipe is a part of the weight which is registered on the scales and a part of the weight which is counterbalanced by the counterbalance weight 77, which latter is regulated to cause the weight of the tank and its attendant parts to register zero on the scales.

In the present exemplification the tank is supported from its upper end. In order to avoid undesirable vibration of the lower end of the tank, straps 143 are provided, articulated respectively with lugs 144 depending from the bottom of the tank, at the outer ends of said straps, and with the bowl 25 at the inner ends of said straps, the first-named articulations being by means of screws and nuts 145 passing through holes in the outer ends of said straps and lugs, the latter articulation being by means of screws 146 passing through holes in the inner ends of said straps and threaded into the bowl. These holes are sufficiently large or formed as slots and the articulations are sufficiently loose to permit free weighing or measuring movement of the tank, but limit excess vibrations thereof. The straps are shown located at the respective sides of the bowl and extending diagonally to opposite sides of the tank. (See Figs. 2 and 4.)

The temperature of the contents of the tank is indicated on a thermometer 151, the bulb 152 of which is received in a thimble 153 extending through and secured in an opening 154 in the tank, and having close connection with said tank by means of a gasket 155 and a gland 156. The bulb of the thermometer is suitably secured in said thimble, as by having the indicating bar 157 thereof threaded into the outer end of said thimble, this bar having a usual scale thereon.

The thimble is preferably of metal so as to protect the bulb of the thermometer, the metal readily transferring the heat of the contents of the tank to the thermometer, and the swirling or mixing motion imparted to said contents by the injection of the jets of fluid readily mixing said contents so as to impart even temperature throughout said contents. The colder and hotter parts of the fluid received through the respective inlet-pipes readily mix in the feed stand pipe and the branches thereof, so that by the time they are discharged into the tank they have been quite thoroughly mixed, the mixture being continued by the rotating of the liquid in the tank by the directions in which the jets are injected thereunto.

The tank is provided with a cover 161 having an annular bead 162 received within the wall of the top of the tank, and shown formed of a plurality of sections which separate along the median joint 163, which includes an opening 164 about the supporting lug 58. The joint comprises a flange 165 on one of the sections of the cover arranged to receive the inner margin of the other section of the cover between it and lugs 166 secured to the section of the cover on which the flange is formed.

The outlet-pipe is preferably spaced from the feed-pipe by a space 168, extending around the feed-pipe, forming an outlet-passage between the feed-pipe and the outlet-pipe. The tank and the discharge-pipe are arranged to have free movement with relation to the feed-pipe, and the outlet-pipe may be of such height as to limit the height of contents of the tank. The free lateral movement of the discharge pipe about the feed-pipe aids in preserving free passage through the discharge pipe and prevents clogging of the discharge passage, and also aids in freedom and extent of movement of the hose 104.

In employing my invention, the valves 41, 42, are manipulated to regulate the relative proportions of colder and hotter fluid to approximate the desired temperature of the liquid in the tank. The fluid passing through said valves passes through the stand feed-pipe 45 and the branches 48, 49, thereof, being discharged through the holes 56, the holes being directed to cause the rotating movement in the tank, the colder and hotter fluids mixing in their passage through the stand pipe and its branches, and while rotating in the tank. The holes in the branch-pipes are related so as to rotate the liquid not only laterally but in up and down direction to thoroughly and quickly mix the entire body of liquid.

As the amount of liquid in the tank increases, its weight and quantities are also indicated on the scales 87. The temperature of the fluid is also indicated on the thermometer 151. If the thermometer indicates that the liquid in the tank should be hotter, the valves 41, 42, are manipulated for either decreasing the amount of colder fluid or increasing the amount of hotter fluid, to increase the temperature of the liquid in the tank, as indicated on the thermometer, to the desired temperature indication on the thermometer. If the liquid is to be colder, the valve or valves are reversely operated for decreasing the temperature of the liquid in the tank.

In this manner the desired temperature for the liquid which is to be discharged into the baker's batch may be regulated with accuracy and its weight or volume may also be regulated with accuracy. If the desired amount of liquid has been received in the tank, as indicated on the scales, and is of the desired temperature and properly mixed, the valves 41, 42, are closed, and the valve 103 is opened for discharging the liquid in the tank through the discharge-pipe, the flexible portion of which is led to the vessel or container in which said batch or ingredients thereof are being mixed. Such discharge may be continued until the tank is empty, or, if it is desired to discharge only a portion of the liquid in the tank into said batch, the discharge is regulated according to the reading on the scales 87, for discharging a given number of pounds, or a given number of gallons, or other unit of measure into the batch.

If it is desired to reduce the quantity of liquid in the tank to a given weight or quantity, any undesired quantity may be discharged through the flexible pipe into the passage 138, such discharge being regulated by the valve 103 and being stopped when the scales indicate the desired weight or quantity in the tank. The discharge may then be continued into the batch until the desired quantity for the batch has been discharged, as indicated on the scales, and the discharge then discontinued, and another quantity, as indicated on the scales, may be discharged into another batch, and any excess discharged into the outlet-pipe, as may be desired.

Having thus fully described my invention, what I claim as new, and desire to secure by Letters Patent, is:

1. In a device of the character described, the combination of a tank comprising an outer wall and a median wall having an annular material space between them, and a median support for said tank comprising a feed-passage, said median support extending upwardly above said tank, and supporting means on said tank coacting with said support for supporting said tank, said median wall surrounding said feed-passage, and branches of said feed-passage located in said annular space.

2. In a device of the character described, the combination of a tank, a central outlet-pipe extending upwardly therein and having attachment with the bottom of said tank and opening downwardly to the outside of said tank, a central support for said tank extending through said outlet-pipe and supporting means between the upper end of said support and said tank, said outlet-pipe spaced laterally from said central support.

3. In a device of the character described, the combination of a tank, a central outlet-pipe extending upwardly therein and having attachment with the bottom of said tank and opening downwardly to the outside of said tank, said outlet-pipe having an inflow opening in said tank for limiting the height of liquid in said tank, a central support for said tank extending upwardly through said outlet-pipe and provided with an inlet-passage into said tank, and supporting means between the upper end of said support and said tank, said outlet-pipe spaced laterally from said central support.

4. In a device of the character described, the combination of a tank, a median support, suspending means for said tank between the upper end of said support and said tank, and an outlet-pipe surrounding said support and connected with the bottom of said tank and having an outlet passage therein between said support and said outlet-pipe, the lower end of said tank laterally movable for changing the relative lateral positions between said outlet-pipe and said support.

5. In a device of the character described, the combination of a tank, a median support for the same comprising a feed-passage, and suspending means for the tank between the upper end of said median support and said tank.

6. In a device of the character described, the combination of a tank, a median support for the same comprising a feed-passage, said tank provided with an outlet passage about said feed-passage, suspending means for said tank between the upper end of said median support and said tank constructed and arranged whereby swinging movements are permitted said tank, and means located between said support and said tank for limiting said swinging movements.

7. In a device of the character described, the combination of a tank, a median support for the same, an outlet-pipe attached to said tank and surrounding said median support, said support comprising a bowl under said tank, the lower end of said outlet-pipe communicating with said bowl, and suspending means for said tank between the upper end of said median support and said tank.

8. In a device of the character described, the combination of a tank, a median support for the same, an outlet-pipe attached to said tank and surrounding said median support, said support comprising a bowl under said tank, the lower end of said outlet-pipe communicating with said bowl, suspending means for said tank between the upper end of said median support and constructed and arranged whereby swinging movements are permitted said tank, and steadying means to limit the swinging of said tank.

9. In a device of the character described, the combination of a support comprising a bowl having a web provided with an inlet-passage therethrough and having openings at the respective sides of said bowl to outside of said bowl and a median opening, a feed-pipe having connection with said median opening, a tank, and an outlet-pipe surrounding said feed-pipe having connection at its lower end with the bottom of said tank, said outlet-pipe arranged to discharge into said bowl at the respective sides of said web.

10. In a device of the character described, the combination of a support comprising a bowl having a web provided with an inlet-passage therethrough and having openings at the respective sides of said bowl to outside of said bowl and a median opening, a feed-pipe having connection with said median opening, a tank, an outlet-pipe surrounding said feed-pipe having connection at its lower end with the bottom of said tank constructed and arranged whereby lateral swinging movements are permitted said outlet pipe, said outlet-pipe arranged to discharge into said bowl at the respective sides of said web, and steadying bars for the lower end of said tank having connections respectively with said bowl and with said tank.

11. In a device of the character described, the combination of a support comprising a bowl having a web provided with an inlet-passage therethrough and having openings at the respective sides of said bowl to outside of said bowl and a median opening, a feed-pipe having connection with said median opening, a tank, an outlet-pipe surrounding said feed-pipe having connection at its lower end with the bottom of said tank, said outlet-pipe arranged to discharge into said bowl at the respective sides of said web, and a flexible discharge-pipe for said tank, said bowl provided with an opening arranged to receive said flexible discharge-pipe.

In testimony whereof, I have hereunto signed my name.

PAUL S. WARD.

CERTIFICATE OF CORRECTION.

Patent No. 1,660,110.　　　　　　　　　　　Granted February 21, 1928, to

PAUL S. WARD.

It is hereby certified that error appears in the printed specification of the above numbered patent requiring correction as follows: Page 5, line 51, claim 8, before the word "constructed" insert the words "said tank"; and that the said Letters Patent should be read with this correction therein that the same may conform to the record of the case in the Patent Office.

Signed and sealed this 3rd day of April, A. D. 1928.

Seal.

M. J. Moore
Acting Commissioner of Patents.